March 13, 1928.                J. C. SHIER                1,662,211
                      ACCELERATOR CONTROLLING DEVICE
                          Filed Feb. 4, 1927
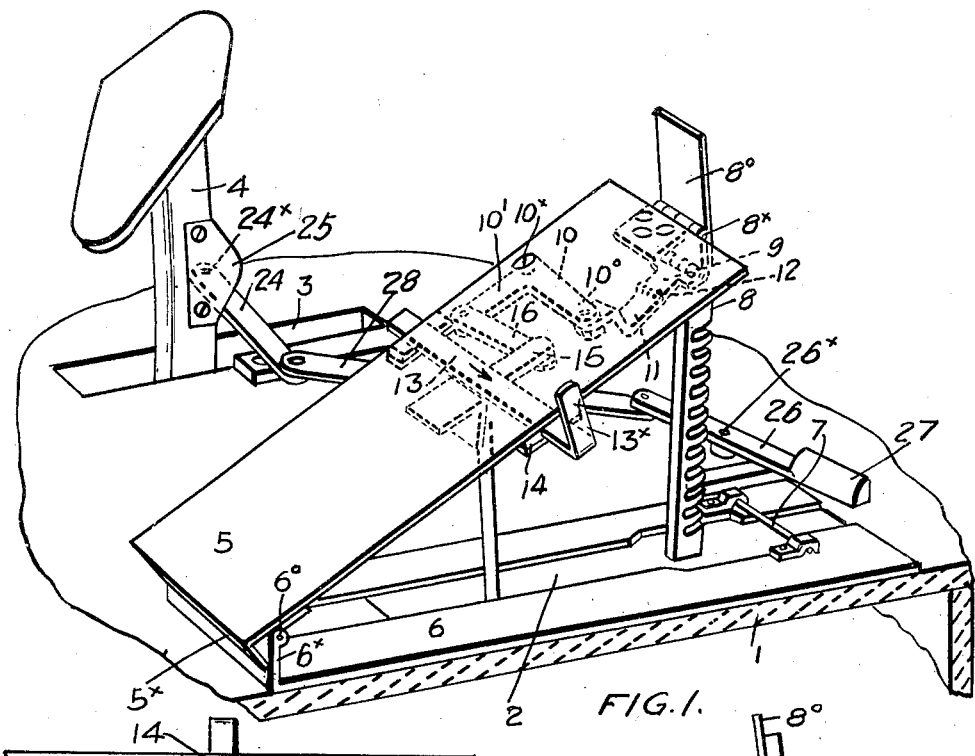
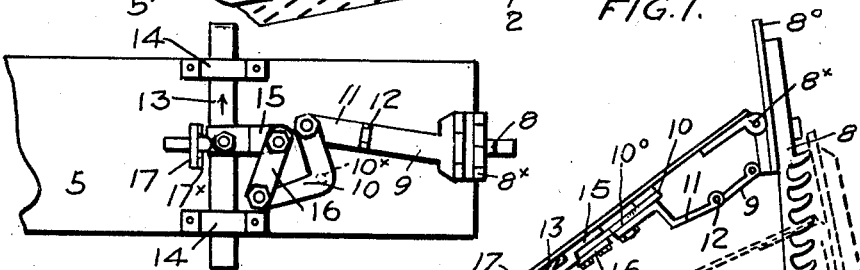
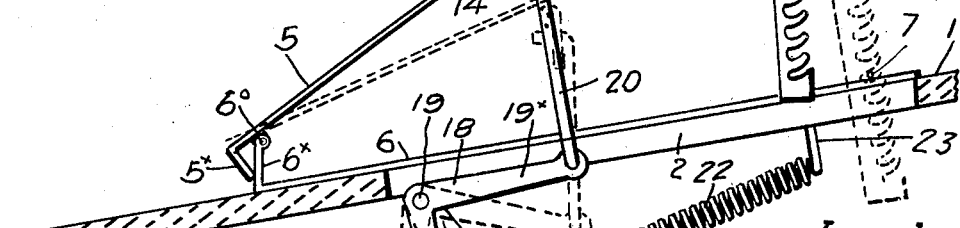
Inventor
J. C. Shier
by Fetherstonhaugh Co
Attys Patented Mar. 13, 1928.

1,662,211

UNITED STATES PATENT OFFICE.

JAMES CORNAIL SHIER, OF TORONTO, ONTARIO, CANADA.

ACCELERATOR-CONTROLLING DEVICE.

Application filed February 4, 1927. Serial No. 165,940.

My invention relates to improvements in accelerator controlling devices, and the object of the invention is to device means whereby the accelerator may be releasably held in any position to which it has been adjusted, and it consists essentially of the arrangement and construction of parts as hereinafter more particularly explained.

Fig. 1 is a perspective view of my accelerator and the controlling device thereof.

Fig. 2 is a vertical section through Figure 1 taken longitudinally through the accelerator pedal.

Fig. 3 is an inverted plan view of a portion of the accelerator pedal and the operating mechanism carried thereby.

In the drawing like characters of reference indicate corresponding parts in each figure.

1 indicates a portion of a floor board of a car provided with a slot 2 through which the accelerator mechanism operates and the slot 3 for the brake lever 4.

5 is the accelerator pedal which is hingedly mounted as indicated at 6° and provided at its lower end with an inturned portion 5ˣ adapted to bear normally against the upturned portion 6ˣ of the supporting bracket 6 so as to limit the upward movement of the accelerator pedal.

7 is a cross bar extending transversely of the slot 2 in proximity to its forward end.

8 is a rack bar hingedly mounted at 8ˣ to the forward edge of the pedal 5 and provided with an upward extension 8° with which the toe of the operator is adapted to be brought into engagement to release the rack 8 as will hereinafter be described.

9 is a link member also hingedly secured to the rack 8 below the accelerator pedal 5.

10 is a bell crank pivotally mounted at 10ˣ beneath the accelerator pedal 5 and having one arm 10° thereof pivotally connected to a link member 11 which is hingedly connected at 12 to the link member 9.

13 is a slide bar held in guides 14 so as to be movable transversely of the accelerator pedal 5.

15 is an arm extending forwardly from the slide bar 13 and connected by a link 16 to the other arm 10¹ of the bell crank lever 10.

The slide bar 13 is provided at its right hand side with an upturned extension 13ˣ.

17 is a plate hingedly connected at 17ˣ to the accelerator pedal so as to depend therefrom and provided with an orifice 17°.

18 is a bell crank lever pivotally mounted at 19 beneath the floor board 1 and provided with an arm 19ˣ connected by a link rod 20 to the hinge plate 17, the upper end of the rod 20 being provided with a right angular turn portion extending through the orifice 17°. The bell crank 18 is also provided with an arm 19° connected to the pull rod 21 leading to the carburettor and an arm 19¹ which is connected by a tension spring 22 to any suitable anchoring point 23.

When it is desired to operate the accelerator and secure it in its adjusted position the operator depresses the pedal 5 with his foot in the usual manner and then by swinging the toe of his foot sideways engages the upward extension 13ˣ so as to move the sliding bar 13 in the direction of arrow, see Figure 1, and thereby carrying the arm 15 and link 16 in a corresponding direction swinging the arm 10° of the bell crank 10 forward and thereby swinging the rack 8 into engagement with the cross bar 7 which enters between the teeth of the rack as clearly indicated by the dotted position illustrated in Figure 2 thereby securely holding the accelerator pedal in its adjusted position.

When it is desired to release the pedal so as to change the speed the operator forces his foot slightly forward so as to carry his toe against the upward extension 8° which thereby swings the rack 8 on its hinge 8ˣ carrying the teeth of the rack again out of engagement with the rod 7 thereby releasing the pedal so that it may be readjusted to any desired position.

In order to release the accelerator pedal quickly upon emergency I provide the following mechanism.

24 is a lever bar pivotally mounted at 24ˣ on the floor board adjacent to the brake pedal 4 so as to extend transversely of the brake pedal slot 3 in front of the brake pedal arm.

25 is a cam member carried by the brake pedal arm adapted when the brake pedal is operated to engage the lever bar 24 and swing it forward.

26 is a lever pivoted at 26ˣ and provided at its outer end with a cam portion 27 adapted when the lever is swung forward to engage the rack 8 when in the engaged position with the rod 7 so as to force it out of engagement with such rod. The opposite end of the lever 26 is connected by a link 28 to the lever bar 24.

It will thus be seen that should it be desired to release the accelerator quickly upon emergency the natural thing for the operator to do is to press his brake pedal to put on his brakes and in so doing the cam 25 automatically operates the lever 26 so as to swing the cam end 27 thereof forward into engagement with the rack bar 8 and thereby carry it out of engagement with the cross bar 7 thus automatically releasing the accelerator pedal which is carried back to its normal position by means of the spring 22.

From this description it will be seen that I have devised a very simple device whereby an accelerator may be held in any adjusted position and which may be quickly released either by the operation of the foot so that it may be adjusted to any desired position to alter the speed or may be quickly and automatically released upon emergency by the depression of the brake pedal.

What I claim as my invention is:—

1. In an accelerator, the combination with the accelerator pedal, of a rack bar hingedly connected to the pedal at its front edge and depending therefrom below the hinge point, a stationary member with which the rack bar is adapted to be engaged when the pedal is depressed, and means operated by the lateral movement of the foot upon the pedal for moving the rack bar in and out of engagement with such stationary member.

2. In an accelerator, the combination with the accelerator pedal, of a rack bar hingedly mounted at the front edge of the pedal and depending therefrom, a stationary member with which the rack bar is adapted to be engaged when the pedal is depressed, a movable upwardly projecting member located adjacent one lateral edge of the pedal and with which the foot is adapted to engage when moved laterally, means operated by the moving of such projecting member for swinging the rack bar forward into engagement with the stationary engaging member, and means operated by the foot for releasing the rack bar from such engaged member.

3. In an accelerator, the combination with the accelerator pedal, of a rack bar hingedly mounted at the front edge of the pedal and depending therefrom, a stationary member with which the rack bar is adapted to be engaged when the pedal is depressed, a movable upwardly projecting member located adjacent one lateral edge of the pedal and with which the foot is adapted to engage when moved laterally, means operated by the moving of such projecting member for swinging the rack bar forward into engagement with the stationary engaging member, an upwardly extending member forming an extension of the rack member and with which the foot is adapted to engage when moved forward to release the rack bar from the engaging member.

4. In an accelerator, the combination with the foot operated member of the accelerator and the brake pedal, of means for releasably holding such operated member in any adjusted position, a swinging member located adjacent to the movable operating member of the accelerator, a cam carried by the brake pedal, and means operated by the cam for swinging the movable member to release the accelerator holding means.

5. In an accelerator, the combination with the accelerator pedal, of a rack bar hingedly mounted at the front end of the pedal and depending therefrom, a stationary member with which the rack bar is adapted to be carried into engagement when the pedal is adjusted to the desired position, a pivoted lever and means operable independently of the accelerator pedal for carrying such lever into engagement with the rack bar to release the same.

6. In an accelerator, the combination with the accelerator pedal and brake pedal, of a rack bar hingedly mounted at the front end of the pedal and depending therefrom, a stationary engaging member with which the rack bar is adapted to engage to hold the pedal in any desired adjusted position, means operated by the foot upon the accelerator pedal for swinging the rack bar into and out of engagement with the stationary engaging member, and supplemental means operated by the depression of the brake pedal for releasing such rack bar from the stationary engaging member.

7. In an accelerator, the combination with the accelerator pedal and brake pedal, of a rack bar hingedly mounted at the front end of the pedal and depending therefrom, a stationary engaging member with which the rack bar is adapted to engage to hold the pedal in any desired adjusted position, means operated by the foot upon the accelerator pedal for swinging the rack bar into and out of engagement with the stationary engaging member, a cam member carried by the brake pedal, a swinging lever with which the cam engages when the brake pedal is depressed, a lever mounted to swing so as to engage with the rack bar to carry it out of engagement with the stationary engaging member, and a link connection between the cam operated lever and the disengaging lever.

JAMES CORNAIL SHIER.